Figure 1:
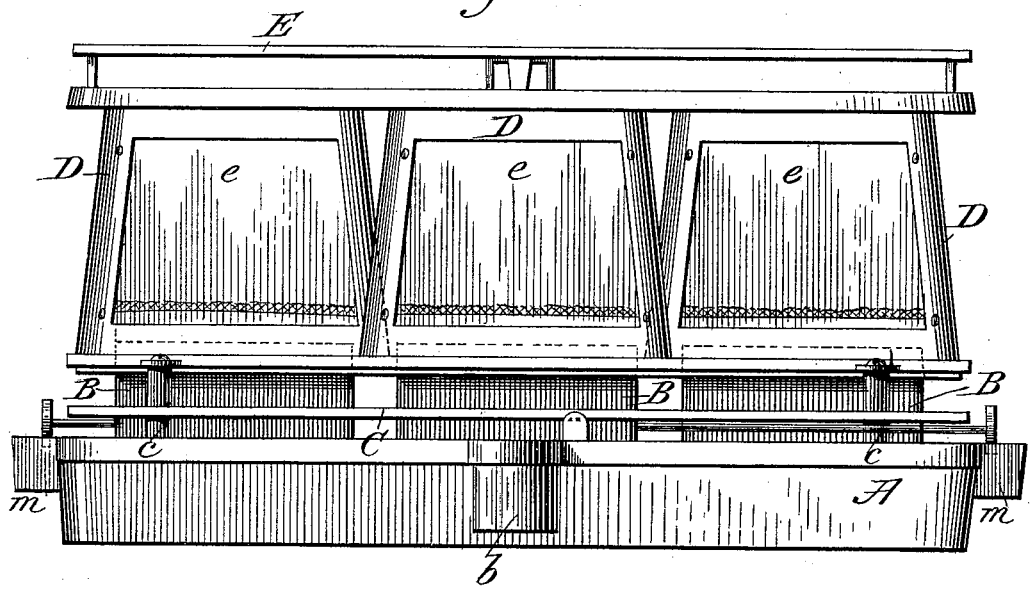

(No Model.) 6 Sheets—Sheet 1.

Q. S. BACKUS.
COMBINED HEATING AND COOKING DEVICE.

No. 344,511. Patented June 29, 1886.

Attest:
H. H. Schott
Fred E. Tasker.

Inventor:
Quimby S. Backus,
per J. C. Tasker, atty.

N. PETERS, Photo-Lithographer, Washington, D. C.

(No Model.) 6 Sheets—Sheet 2.

Q. S. BACKUS.
COMBINED HEATING AND COOKING DEVICE.

No. 344,511. Patented June 29, 1886.

Attest
F. H. Schott
Fred E. Tasker.

Inventor:
Quimby S. Backus,
Pr J. C. Tasker, atty.

(No Model.)
6 Sheets—Sheet 3.

Q. S. BACKUS.
COMBINED HEATING AND COOKING DEVICE.

No. 344,511. Patented June 29, 1886.

Attest:
F. H. Schott
Fred E. Tasker

Inventor:
Quimby S. Backus,
per J. C. Tasker, Atty.

(No Model.)  6 Sheets—Sheet 4.

Q. S. BACKUS.
COMBINED HEATING AND COOKING DEVICE.

No. 344,511.  Patented June 29, 1886.

Attest:
F. H. Schott
P. E. Tasker.

Inventor:
Quimby S. Backus
per J. C. Tasker,
atty.

(No Model.) 6 Sheets—Sheet 5.

Q. S. BACKUS.
COMBINED HEATING AND COOKING DEVICE.

No. 344,511. Patented June 29, 1886.

Attest:
F. H. Schott
Fred E. Tasker

Inventor:
Quimby S. Backus
per J. C. Tasker atty

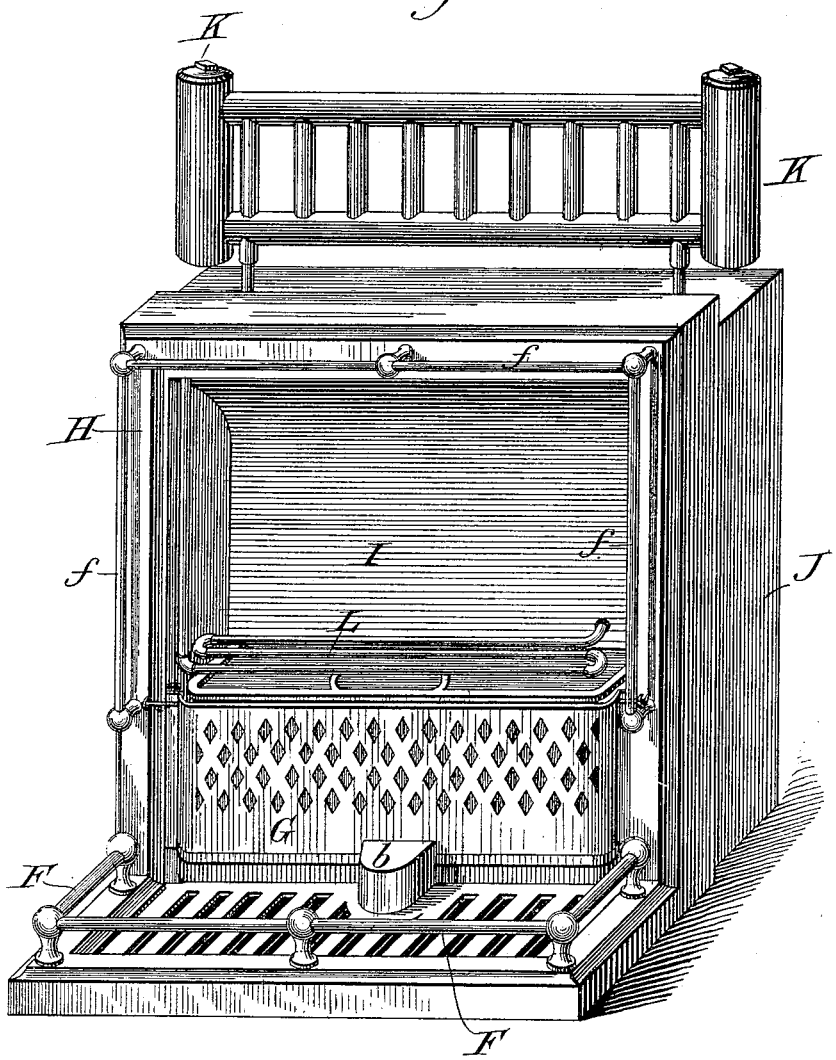

UNITED STATES PATENT OFFICE.

QUIMBY S. BACKUS, OF WINCHENDON, MASSACHUSETTS.

COMBINED HEATING AND COOKING DEVICE.

SPECIFICATION forming part of Letters Patent No. 344,511, dated June 29, 1886.

Application filed September 26, 1885. Serial No. 178,223. (No model.)

*To all whom it may concern:*

Be it known that I, QUIMBY S. BACKUS, a citizen of the United States, residing at Winchendon, in the county of Worcester and State of Massachusetts, have invented certain new and useful Improvements in a Combined Heating and Cooking Device; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a combined heating and cooking device, the object being to provide a device whereby the apartments of houses may be rapidly and cheaply heated in as thorough a manner as is now attainable by any of the most expensive forms of heating apparatus, and that this device shall not be merely a heater, but that it shall perform the additional services of a cooking-stove and a water-boiler, whereby food may be cooked equally well and as expeditiously as it can be by any of the most intricately-contrived culinary arrangements, and water be warmed or boiled for all desirable purposes; and also that the said device may alone be an ornamental piece of furniture when not used in the carrying out of its several functions, which ornamentation is due to the disposition of the many parts, whereby those best calculated to assist each other are brought into juxtaposition.

In a word, the object of the invention is to provide a household article which will be valuable as a heating-stove, a cooking-stove, a boiler, and steam-radiator, and an ornament for a room, the whole being neatly compacted together; and the invention consists in the construction and arrangement of parts, as will be hereinafter fully described, and then pointed out in the claims.

Figure 2:
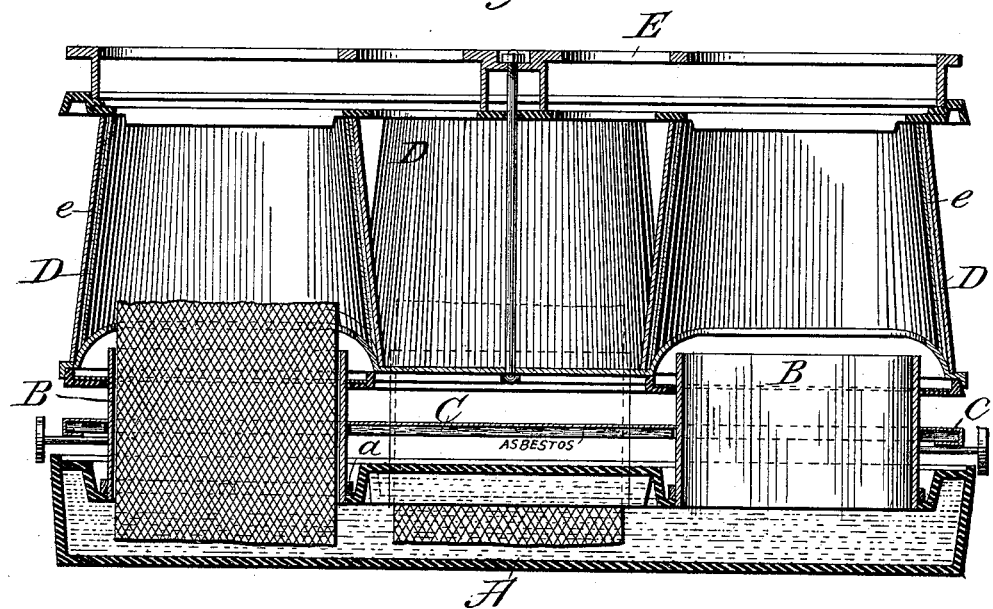
Figure 3:
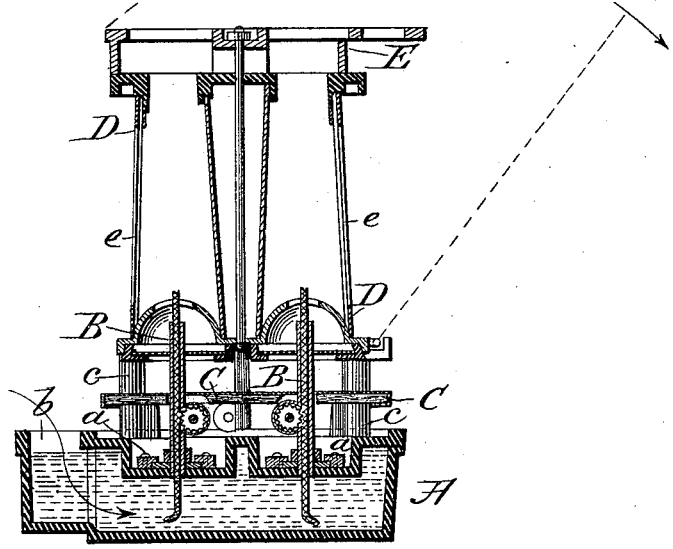
Figure 4:
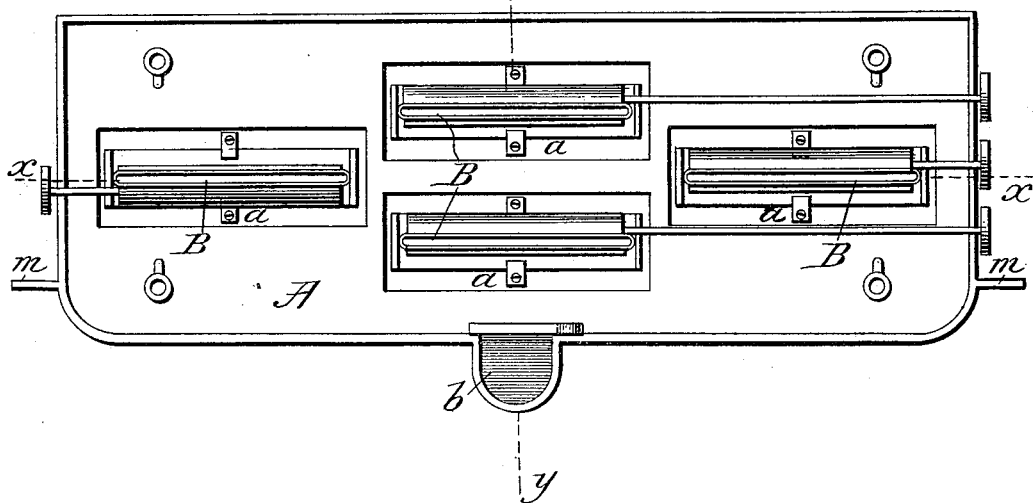
Figure 5:
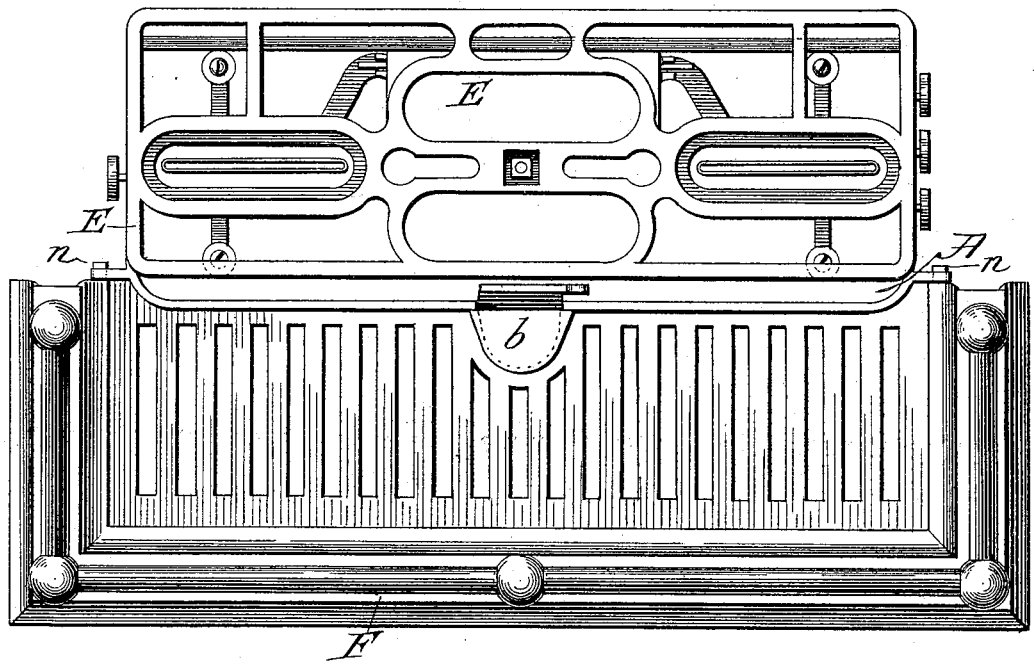
Figure 6:
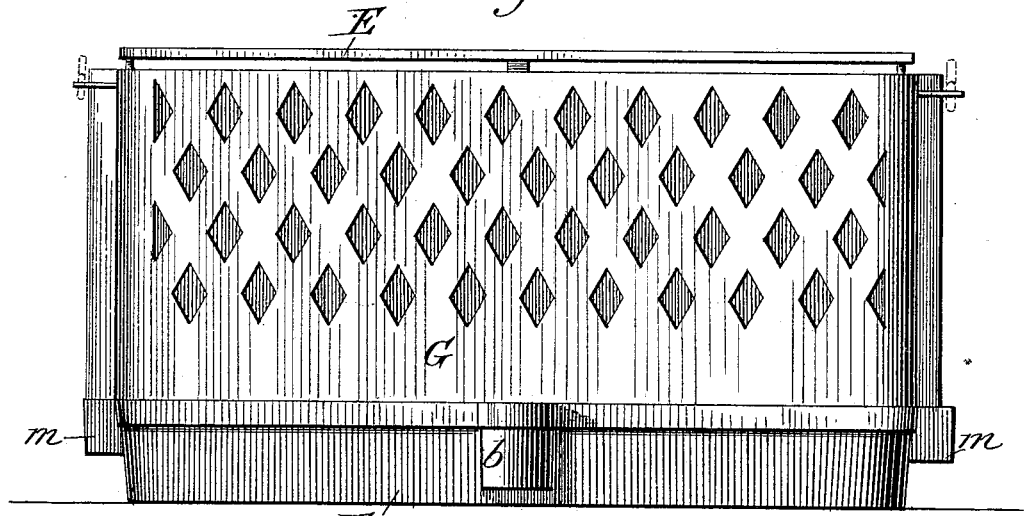
Figure 7:
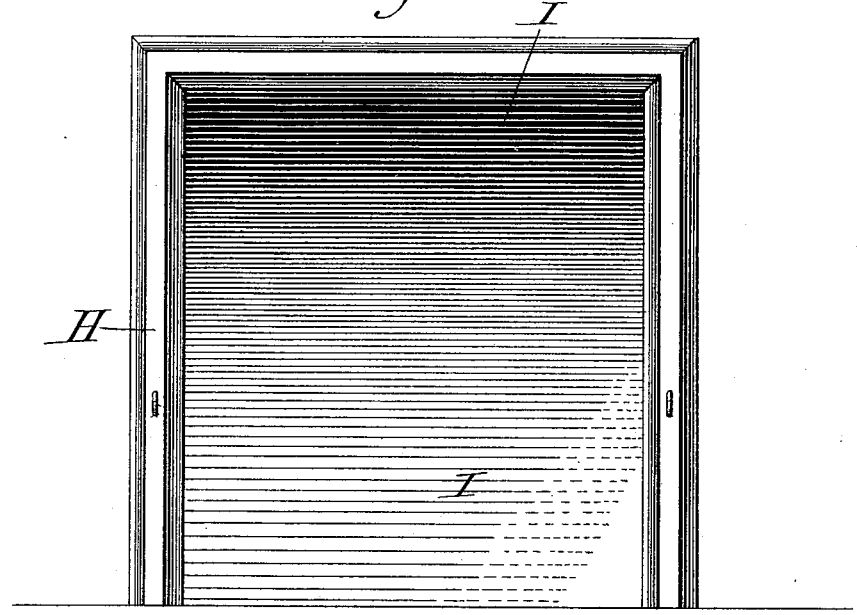
Figure 8:
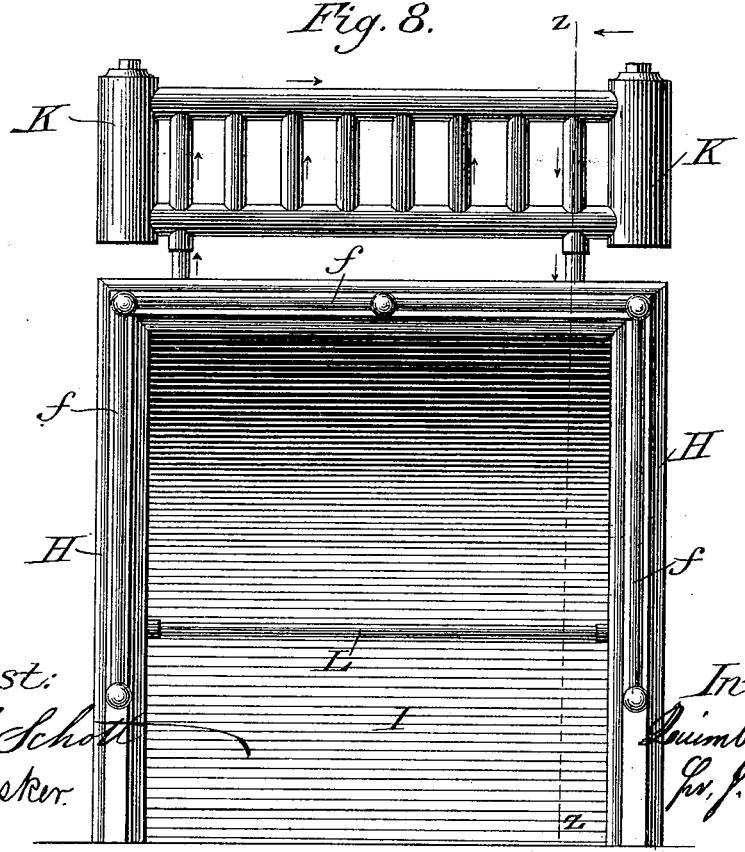
Figure 9:
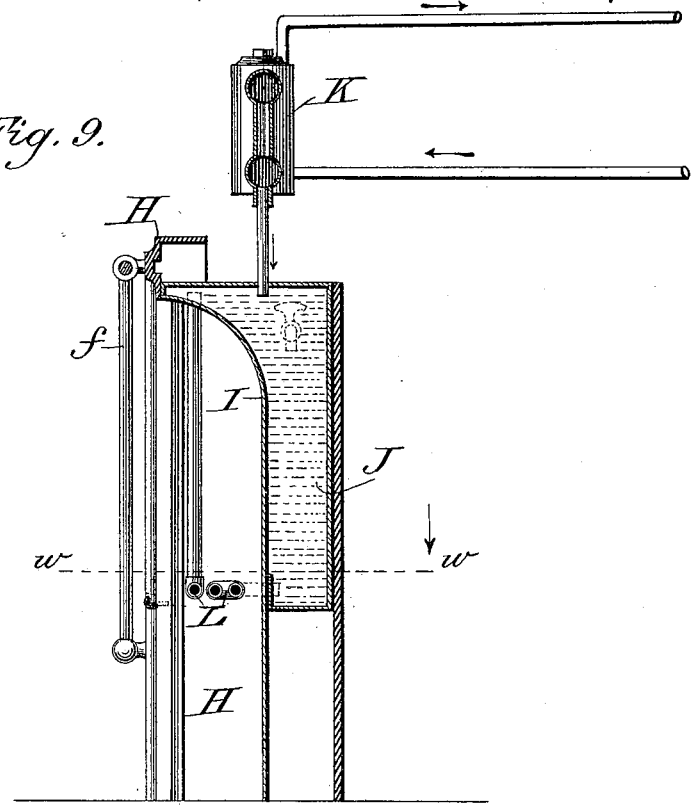
Figure 10:
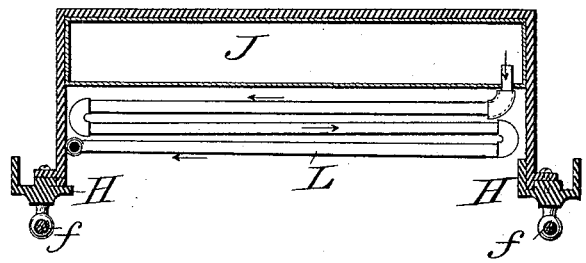

In the annexed drawings, illustrating my invention, Figure 1 is a front elevation of the improved oil-stove which is preferably used in my combined heater and cooker. Fig. 2 is a longitudinal section of the same stove on the line $x\,x$ of Fig. 4. Fig. 3 is a transverse section of the stove on the line $y\,y$ of Fig. 4. Fig. 4 is a top plan view of the stove. Fig. 5 is a plan view of the stove provided with the surrounding foot rail or rest in front. Fig. 6 is a view of the stove and its front guard. Fig. 7 is a front view of the stove-compartment and its reflecting fire-shield. Fig. 8 is a front view of the stove-compartment, the reflecting fire-shield, and the steam-receiver. Fig. 9 is a vertical cross-section of the same on the line $z\,z$ of Fig. 8. Fig. 10 is a horizontal section on the line $w\,w$ of Fig. 9. Fig. 11 is a perspective view of the entire device.

Like letters of reference designate like parts in the several views.

I will first proceed to describe the construction and operation of the improved oil-stove which I use in my device, although it is evident that other stoves different in pattern and operation from the one now to be described may be used in connection with other parts of my invention without departing from the spirit of the same. However, the improved oil-stove herein portrayed is probably calculated to produce the best results.

A represents the base or oil-reservoir of the stove, which may be of rectangular or any other desirable form, and this reservoir may be formed with a tubular projection, $b$, for convenience in filling the same. The upper surface of the reservoir A is provided with longitudinal pans or depressions $a$, as shown in Fig. 1, to the bottoms of which are secured by suitable means the wick-tubes B. These depressions are preferably longitudinal. As the result of providing these pans or depressions $a$, the line of the oil-level within the reservoir is situated at some distance above the base of the wick-tubes; hence the distance between the top of the wick and the oil-level will be lessened in proportion to the depth of the pans. Thus the wick will not have to draw the oil so far to reach the flame, since the pressure of the oil in the reservoir will cause the oil to pass up into the wick-tubes to the same height as the oil in said reservoir. The result will be that there will not be the liability of a change in the burning of the wick, but this burning will be steady and even; also, there will be a much larger flame, and consequently a greater amount of heat given off than is the case with those stoves where the distance from the top of the wick to the oil is great and the wick has to exert its capillary force to an increased extent. It is to be observed, however, that I do not claim, broadly, this construction of a stove, the same thing being found in many other heaters; but I find it convenient to recite the same here in order to give a better idea of the entire device. Further, I have provided the stove which I prefer to use with an asbestus layer, C, interposed between the oil-reservoir and the top of the wick-tubes, giving at the same time recognition to the fact that asbestus has heretofore been used in stoves for a like purpose.

Many other devices have hitherto been employed for keeping the oil cool and away from proximity to the flame; but in stoves where the oil-reservoir is situated directly beneath the burner this has generally been accomplished at the sacrifice of other benefits, because the device constructed for the purpose has generally taken up so much room that the distance from the oil to the top of the wick has been greatly increased. Thus the larger the stove the less would be the flame, for in increasing the size of the stove we must increase the size of the device for keeping the oil cool, and in this manner we bring about a reduction in the effectiveness of the flame, and the less the flame the more smoke will there be and the more offensive odor. Therefore, in order to allow me to use a large stove, and also to reap the advantages of keeping the wick-top close to the oil and still not heat the latter, I select the asbestus layer as the best of all the known devices for the purpose. This asbestus lining is in the drawings represented as attached for convenience to a metallic plate—such as tin—which rests upon lugs or pins $c$, projecting from the base A and passing through it, the said plate being also slotted to fit over the burners. Upon these pins rests a second plate or skeleton frame, which upholds and supports the lamp-chimneys and the remaining part of the stove, to be presently described. It will be readily seen that this asbestus layer needs to be but thin in order to accomplish the desired result, so that but very little space is taken up by it, and the space between the oil and the flame is not materially increased.

Reference to Figs. 1 and 2, and also to Fig. 4, will show the manner in which I propose to arrange the burners or wick-tubes B. These wick-tubes are arranged lengthwise of the stove, and as regards each other are placed end to end, so as to present a continuous line of flame from one end of the stove to the other directly beneath a longitudinal pipe-coil, to be hereinafter described.

D represents chimneys or casings for the wick-tubes and the flame. These are attached together in any convenient manner, and a frame-work or plate, E, is placed upon their upper portion, as shown in Fig. 1, to serve as the top of the oil-stove.

In order to use this stove to the best advantage, I have provided it with a bottom guard or rail, F, and a front guard or screen, G.

Fig. 5 is a plan view of the stove, showing the bottom guard, F, placed in position. This guard enhances the usefulness of the stove. It enables it to be used for many purposes additional to its ordinary functions, and it enables those ordinary functions to be carried out with greater ease. This guard is made in any suitable form, and is preferably of an ornamental form, so as to embellish the appearance of the entire device. It serves as a protector for the oil-reservoir, keeping it from injury. It serves also as a rest for dishes and utensils of various kinds which are used with the stove. This bottom guard is adapted to be attached to the stove by means of lugs $n$, which engage the lugs or projections $m$ upon the stove, thus enabling the bottom guard and stove to be moved out together from within the compartment. Such articles as china-ware, &c., which it may be desirable to warm before use, can be placed upon this bottom guard and heated as well there as they could in a stove-oven.

In Fig. 6 we have the front guard, G, shown as attached to the stove. This is fashioned of any pattern, such as the diamond-work of the drawing or any other design. This guard G is detachably hinged on a line with its upper edge at a point substantially on a level with the top of the chimneys, so as to be removable at pleasure. It serves in warm weather to keep the heat from coming into the room, and at all times when in use assists in the ornamentation of the device. A second guard is sometimes used in connection with this, and is situated above it in an inclined position, so as to partially cover and hide the top of the stove. The stove is thus entirely secluded from view, and in place of it an ornamental frame-work is presented to the eye; but this device is to be used as a heater as well as a cooker. It therefore becomes necessary to next explain the construction of the parts which adapt the device to heating purposes.

H represents a stove-compartment frame constructed ornamentally, with an encircling rail, $f$, having knobs or plain faces without the rail, but patterned after some design, if so desired. In the back of this is placed a reflecting-shield, I, of burnished copper or other metal. This reflector is curved throughout the upper portion, as shown in Figs. 7, 9, and 11, partly in order to add to the beauty and finish of the article as a piece of furniture, but principally in order to focalize the rays of heat in such a manner that they will be driven out into the room and also be concentrated upon the pipe-coil in advance of the shield. Within this compartment there is placed the stove.

When the stove is used for cooking, it can be drawn out in front of this casing, away from the reflecting-shield I, so as to allow a readier access to the top of the stove for the placing and removal of articles.

In the rear of the reflector is situated a boiler, J, in which water may be heated, and conveyed thence by pipes for use in the same or different rooms. (See Fig. 9.)

K represents a steam-receiver or series of steam-pipes. It is located upon the top of the water-boiler and connected therewith by pipes passing through the boiler-casing. By this means the steam which is formed in the water-boiler passes upward into the series of pipes and assists in heating. It may also be conveyed into other and separate apartments for the purpose of heating them. I have provided also a pipe, L, which connects with the water-boiler and passes thence to near the top of the stove, as represented in the drawings. Here it coils once or twice immediately over the top of the stove, where the heat may act directly upon it; thence it passes back into the top of the boiler. Thus the water goes from the boiler, traverses this pipe, and then returns to the boiler, being heated during its course. This pipe enables a continual circulation to be kept up. We have then a longitudinal pipe coiled in advance of the fire-shield and directly over the stove, so that the line or lines of flame from the stove may act directly upon the coil and heat the water contained therein. In addition to this heat directly given to the pipe-coil there will also be the reflected heat thrown upon it by the reflecting-shield.

I have thus described the construction and arrangement of the several parts of the compartment within which the stove is to be placed. When the stove is so placed and everything is arranged as I have described, it is clearly seen how many beneficial results will be derived from the combined heating and cooking properties of the device. For the heat of the stove will warm the reflecting-shield, and this will reflect and radiate heat into the room in addition to the heat that is given out by the stove itself on the side away from the reflector. The heat also will warm the water in the boiler, through the agency of the pipe and pipe-coil. A certain amount of heat will also be conducted to the boiler by passing through this reflector, the intervening space, (provided this be not lined with asbestus,) and the boiler-casing; and heat will also reach the water by conduction through the various parts of the compartment-frame. Then, when it is so desired, the stove can be removed from beneath the pipe-coil and articles placed thereon to be cooked; and besides all these advantages there is the artistic value of the device.

A separate application for Letters Patent, filed by me November 23, 1885, Serial No. 183,736, contains certain features shown and described in this case, such as the steam-radiator and a lengthened pipe-coil connecting therewith. These are therefore not claimed herein, but reserved for the aforesaid application.

Having thus described my invention, what I claim as new, and desire to secure by Letters Patent, is—

1. In a heating and cooking device, the combination of a removable lamp-stove, a compartment for the same provided with a reflecting fire-shield, a water-boiler situated in the rear of said fire-shield, and a pipe connecting with the water-boiler, and coiled in advance of the fire-shield, above the lamp-wicks, substantially as and for the purpose shown and described.

2. In a heating and cooking device, the combination of a stove-compartment having a reflecting fire-shield, a lamp-stove contained within the same, a water-boiler, a pipe connecting with the water-boiler and coiled in advance of the fire-shield, above the lamp-wicks, and a steam-receiver, substantially as shown and described.

3. The combination, with a compartment open at one side and having an open-work front guard extending across the open side of the same, of a lamp-stove situated within the compartment and having a series of flat wick-tubes arranged in different lines overlapping each other and extending entirely across the compartment, substantially as described.

4. The combination of a removable lamp-stove, a compartment for the same, and an open-work front guard hinged in line with its upper edge to the compartment at about the height of the lamp-chimneys, substantially as and for the purpose set forth.

5. The combination, with the stove-compartment, of a lamp-stove and a front guard connected with the said stove, so that they may be removable together from the compartment, substantially as described.

In testimony whereof I affix my signature in presence of two witnesses.

QUIMBY S. BACKUS.

Witnesses:
FRED E. TASKER,
E. L. WHITE.